United States Patent
Demoret

[11] Patent Number: 5,983,411
[45] Date of Patent: Nov. 16, 1999

[54] TOILET TANK AQUARIUM

[76] Inventor: Herbert Demoret, HC 76 Box 314, Marshall, Ark. 72650

[21] Appl. No.: 09/130,099

[22] Filed: Aug. 6, 1998

[51] Int. Cl.⁶ .................................................. E03D 1/00
[52] U.S. Cl. ................................. 4/353; 4/363; 4/661
[58] Field of Search ............................ 4/353, 363, 538, 4/661, 364

[56] References Cited

U.S. PATENT DOCUMENTS

| | | | |
|---|---|---|---|
| 4,174,589 | 11/1979 | Daharsh | 4/353 |
| 4,307,923 | 12/1981 | Raz | 4/353 |
| 4,364,132 | 12/1982 | Robinson | 4/538 |
| 4,371,992 | 2/1983 | Rivera | 4/353 |
| 5,027,493 | 7/1991 | Wood, Jr. et al. | 4/353 |
| 5,067,180 | 11/1991 | Figeroid | 4/363 |

*Primary Examiner*—David J. Walczak

[57] ABSTRACT

A new toilet tank assembly aquarium for housing aquatic creatures. The assembly includes a toilet bowl assembly with a toilet tank assembly coupled to the toilet bowl assembly. The toilet tank assembly has a top, a front, a back, and a pair of sides. The front, back and sides of the toilet tank assembly define an interior space with the top of the toilet tank assembly having an opening into the interior space of the toilet tank assembly. A toilet water reservoir is located in the interior space. A lid substantially covers the opening of the top of the toilet tank assembly. The front of the toilet tank assembly is generally transparent.

10 Claims, 3 Drawing Sheets

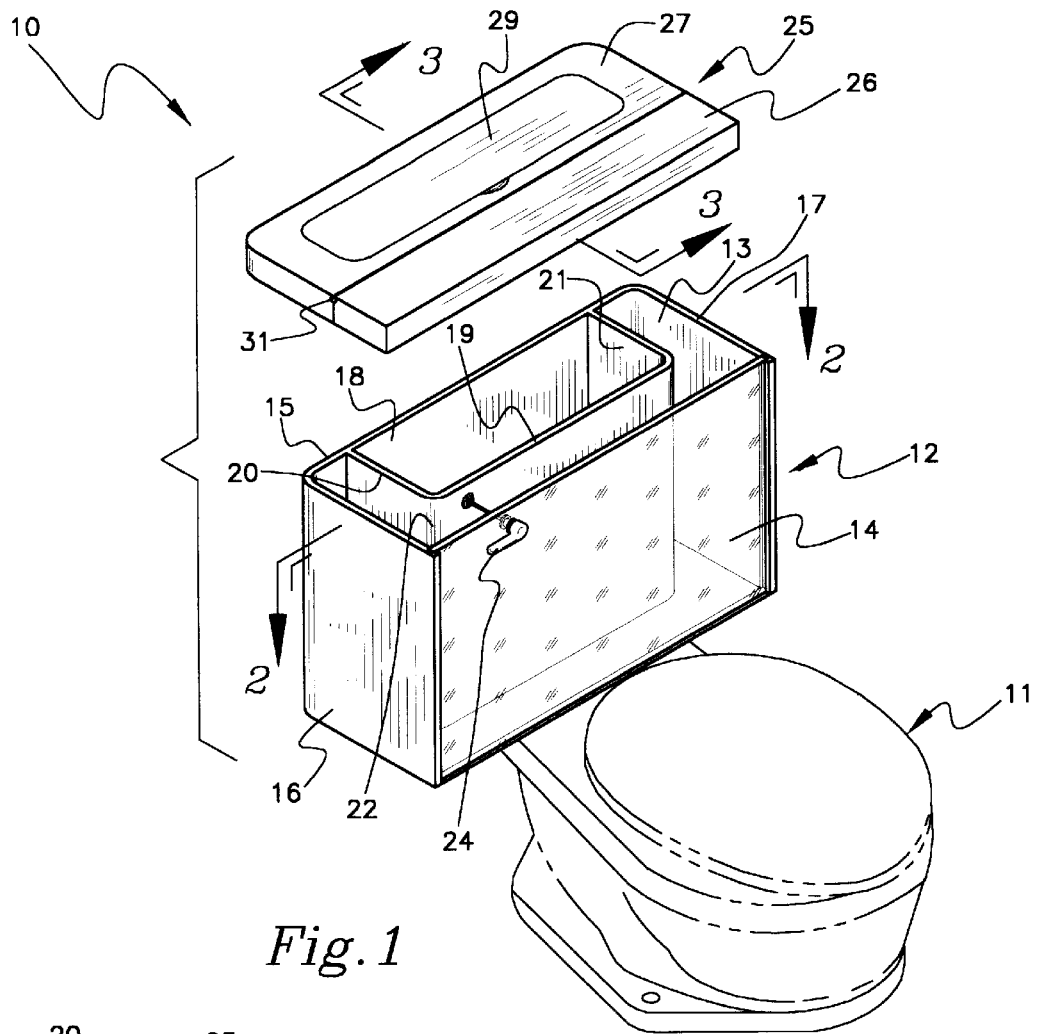
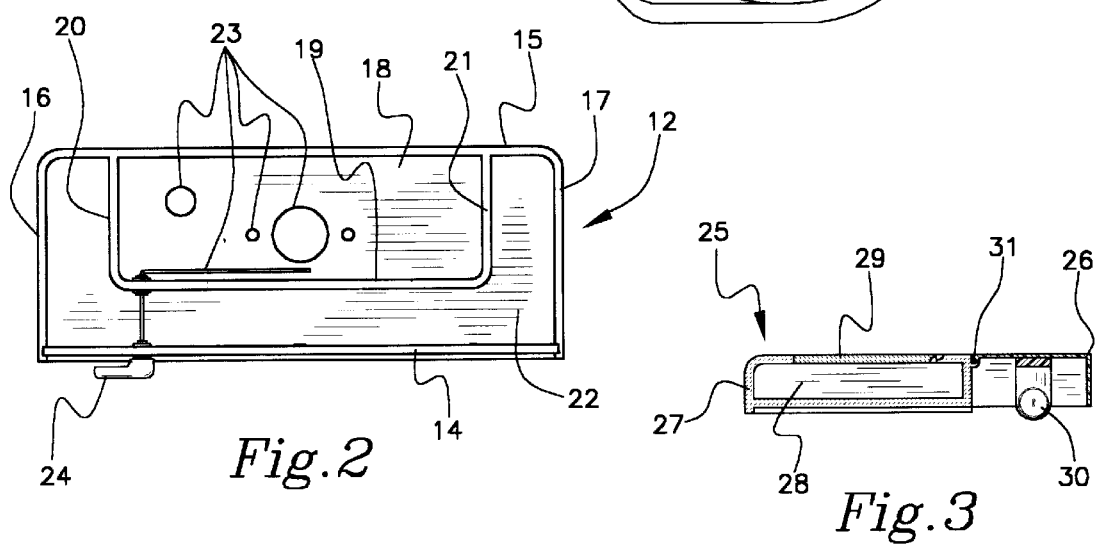
Fig.1
Fig.2
Fig.3

TOILET TANK AQUARIUM

BACKGROUND OF THE INVENTION

1. Field of the Invention

The present invention relates to toilets and more particularly pertains to a new toilet tank assembly aquarium for housing aquatic creatures.

2. Description of the Prior Art

The use of toilets is known in the prior art. More specifically, toilets heretofore devised and utilized are known to consist basically of familiar, expected and obvious structural configurations, notwithstanding the myriad of designs encompassed by the crowded prior art which have been developed for the fulfillment of countless objectives and requirements.

Known prior art toilets include U. S. Pat. No. Des. 270,936; PCT Patent No. WO 93/14628 (inventor: Gerlitzki); U.S. Pat. No. 4,364,132; U.S. Pat. No. 1,957,831; PCT Patent No. WO 87/00020 (inventors: Gurevich et al.); U.S. Pat. No. 3,181,178; and U.S. Pat. No. 5,042,426.

While these devices fulfill their respective, particular objectives and requirements, the aforementioned patents do not disclose a new toilet tank assembly aquarium. The inventive device includes a toilet bowl assembly with a toilet tank assembly coupled to the toilet bowl assembly. The toilet tank assembly has a top, a front, a back, and a pair of sides. The front, back and sides of the toilet tank assembly define an interior space with the top of the toilet tank assembly having an opening into the interior space of the toilet tank assembly. A toilet water reservoir is located in the interior space. A lid substantially covers the opening of the top of the toilet tank assembly. The front of the toilet tank assembly is generally transparent.

In these respects, the toilet tank assembly aquarium according to the present invention substantially departs from the conventional concepts and designs of the prior art, and in so doing provides an apparatus primarily developed for the purpose of housing aquatic creatures.

SUMMARY OF THE INVENTION

In view of the foregoing disadvantages inherent in the known types of toilets now present in the prior art, the present invention provides a new toilet tank assembly aquarium construction wherein the same can be utilized for housing aquatic creatures.

The general purpose of the present invention, which will be described subsequently in greater detail, is to provide a new toilet tank assembly aquarium apparatus and method which has many of the advantages of the toilets mentioned heretofore and many novel features that result in a new toilet tank assembly aquarium which is not anticipated, rendered obvious, suggested, or even implied by any of the prior art toilets, either alone or in any combination thereof.

To attain this, the present invention generally comprises a toilet bowl assembly with a toilet tank assembly coupled to the toilet bowl assembly. The toilet tank assembly has a top, a front, a back, and a pair of sides. The front, back and sides of the toilet tank assembly define an interior space with the top of the toilet tank assembly having an opening into the interior space of the toilet tank assembly. A toilet water reservoir is located in the interior space. A lid substantially covers the opening of the top of the toilet tank assembly. The front of the toilet tank assembly is generally transparent.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new toilet tank assembly aquarium apparatus and method which has many of the advantages of the toilets mentioned heretofore and many novel features that result in a new toilet tank assembly aquarium which is not anticipated, rendered obvious, suggested, or even implied by any of the prior art toilets, either alone or in any combination thereof.

It is another object of the present invention to provide a new toilet tank assembly aquarium which may be easily and efficiently manufactured and marketed.

It is a further object of the present invention to provide a new toilet tank assembly aquarium which is of a durable and reliable construction.

An even further object of the present invention is to provide a new toilet tank assembly aquarium which is susceptible of a low cost of manufacture with regard to both materials and labor, and which accordingly is then susceptible of low prices of sale to the consuming public, thereby making such toilet tank assembly aquarium economically available to the buying public.

Still yet another object of the present invention is to provide a new toilet tank assembly aquarium which provides in the apparatuses and methods of the prior art some of the advantages thereof, while simultaneously overcoming some of the disadvantages normally associated therewith.

Still another object of the present invention is to provide a new toilet tank assembly aquarium for housing aquatic creatures.

Yet another object of the present invention is to provide a new toilet tank assembly aquarium which includes a toilet howl assembly with a toilet tank assembly coupled to the toilet bowl assembly. The toilet tank assembly has a top, a front, a back, and a pair of sides. The front, back and sides of the toilet tank assembly define an interior space with the top of the toilet tank assembly having an opening into the interior space of the toilet tank assembly. A toilet water reservoir is located in the interior space. A lid substantially covers the opening of the top of the toilet tank assembly. The front of the toilet tank assembly is generally transparent.

Still yet another object of the present invention is to provide a new toilet tank assembly aquarium that helps make a bathroom more attractive.

Even still another object of the present invention is to provide a new toilet tank assembly aquarium that can also be used as a terrarium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new toilet tank assembly aquarium according to the present invention.

FIG. 2 is a schematic top side view of the present invention as seen from line 2—2 of FIG. 1.

FIG. 3 is a schematic cross sectional view of the lid of the present invention taken from line 3—3 on FIG. 1.

DESCRIPTION OF THE PREFERRED EMBODIMENT

Figure 4:
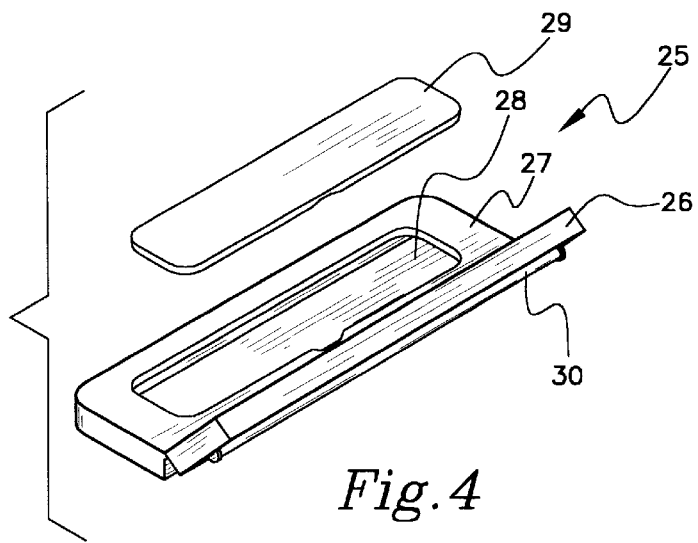
FIG. 4 is a schematic perspective view of the lid of the present invention.

With reference now to the drawings, and in particular to FIGS. 1 through 6 thereof, a new toilet tank assembly aquarium embodying the principles and concepts of the present invention and generally designated by the reference numeral 10 will be described.

As best illustrated in FIGS. 1 through 6, the toilet tank assembly aquarium 10 generally comprises a toilet bowl assembly 11 with a toilet tank assembly 12 coupled to the toilet bowl assembly 11. The toilet tank assembly 12 has a top 13, a front 14, a back 15, and a pair of sides 16,17. The front 14, back 15 and sides 16,17 of the toilet tank assembly 12 define an interior space with the top 13 of the toilet tank assembly 12 having an opening into the interior space of the toilet tank assembly 12. A toilet water reservoir 18 is located in the interior space. A lid 25 substantially covers the opening of the top 13 of the toilet tank assembly 12. The front 14 of the toilet tank assembly 12 is generally transparent.

Specifically, the toilet 10 comprises a toilet bowl assembly 11 with a toilet tank assembly 12 coupled thereto. The toilet tank assembly 12 has a top 13, a front 14, a back 15, and a pair of sides 16,17. The front 14, back 15 and sides 16,17 of the toilet tank assembly 12 define an interior space with the top 13 of the toilet tank assembly 12 having an opening into the interior space of the toilet tank assembly 12. A toilet water reservoir 18 is located in the interior space. Preferably, as illustrated in FIG. 1, the toilet water reservoir 18 comprises a mid wall 19 and a pair of spaced apart side walls 20,21. The mid wall 19 of the toilet water reservoir 18 is spaced apart from the back 15 of the toilet tank assembly 12 with the side walls 20,21 extending between the mid wall 19 of the toilet water reservoir 18 and the back 15 of the toilet tank assembly 12. The toilet water reservoir 18 including a toilet flushing assembly 23 which fluidly connects the toilet water reservoir 18 to the toilet bowl assembly 11. A handle 24 is provided on the front 14 of the toilet tank assembly 12 and is operatively connected to the toilet flushing assembly 23 such that the toilet flushing assembly 23 may be actuated by the handle 24.

The portion of the interior space of the toilet tank assembly 12 between the toilet water reservoir 18 and the sides and front 14 of the toilet tank assembly 12 defines an aquarium reservoir 22 for holding water and aquatic creatures or that may be used as a terrarium. As shown in FIG. 1, the front 14 of the toilet tank assembly 12 is generally transparent so that the aquarium reservoir 22 may be viewed from the outside.

Figure 5:
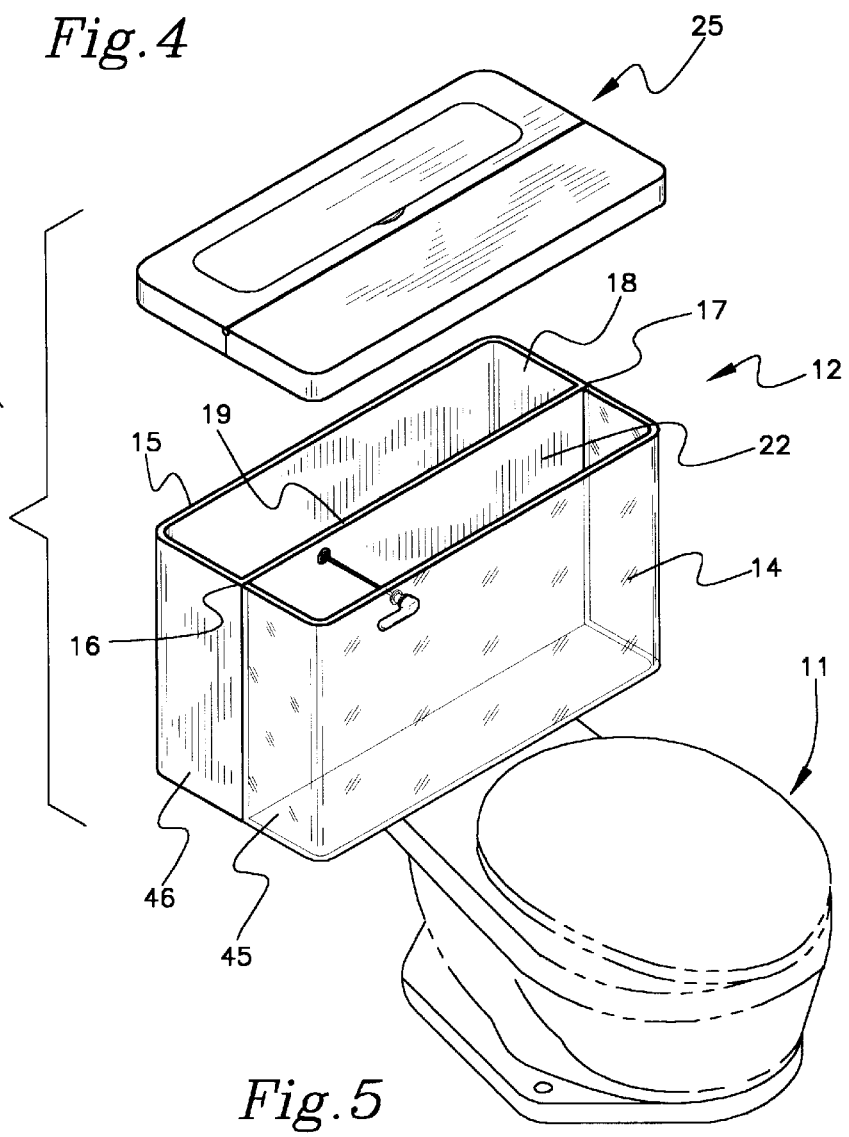
FIG. 5 is a schematic perspective view of a second embodiment of the present invention.

With reference to FIG. 5, in an optional alternate embodiment 32, the toilet water reservoir 18 may not include the side walls 20,21 such that the mid wall 19 of the toilet water reservoir 18 extends between the sides 16,17 of the toilet tank assembly 12. In this embodiment, each of the sides 16,17 of the toilet tank assembly 12 has front and back portions 45,46 with the front portions 45 of the sides of the toilet tank assembly 12 positioned towards the front 14 of the toilet tank assembly 12 and the back portions 46 of the sides of the toilet tank assembly 12 positioned towards the back 14 of the toilet tank assembly 12. As illustrated in FIG. 5, the front portions 45 of the sides 16,17 of the toilet tank assembly 12 are generally transparent.

With reference to FIGS. 3 and 4, a lid 25 substantially covers the opening of the top 13 of the toilet tank assembly 12. The lid 25 has an interior, a top, a bottom, and front and back portions 26,27. The top of the lid 25 preferably has a compartment 28 which is designed for storing items such as aquarium supplies therein. The compartment 28 is preferably located in the back portion 27 of the lid 25 and has a cover 29 substantially covering it. As shown in FIG. 3, the bottom of the lid 25 has a light source 30 located on the front portion 26 of the lid 25. The light source 30 is designed for shining light into the aquarium reservoir 22 of the toilet tank assembly 12. As depicted in FIG. 4, the front and back portions 26,27 of the lid 25 are preferably pivotally coupled to one another by a hinge 31.

Figure 6:
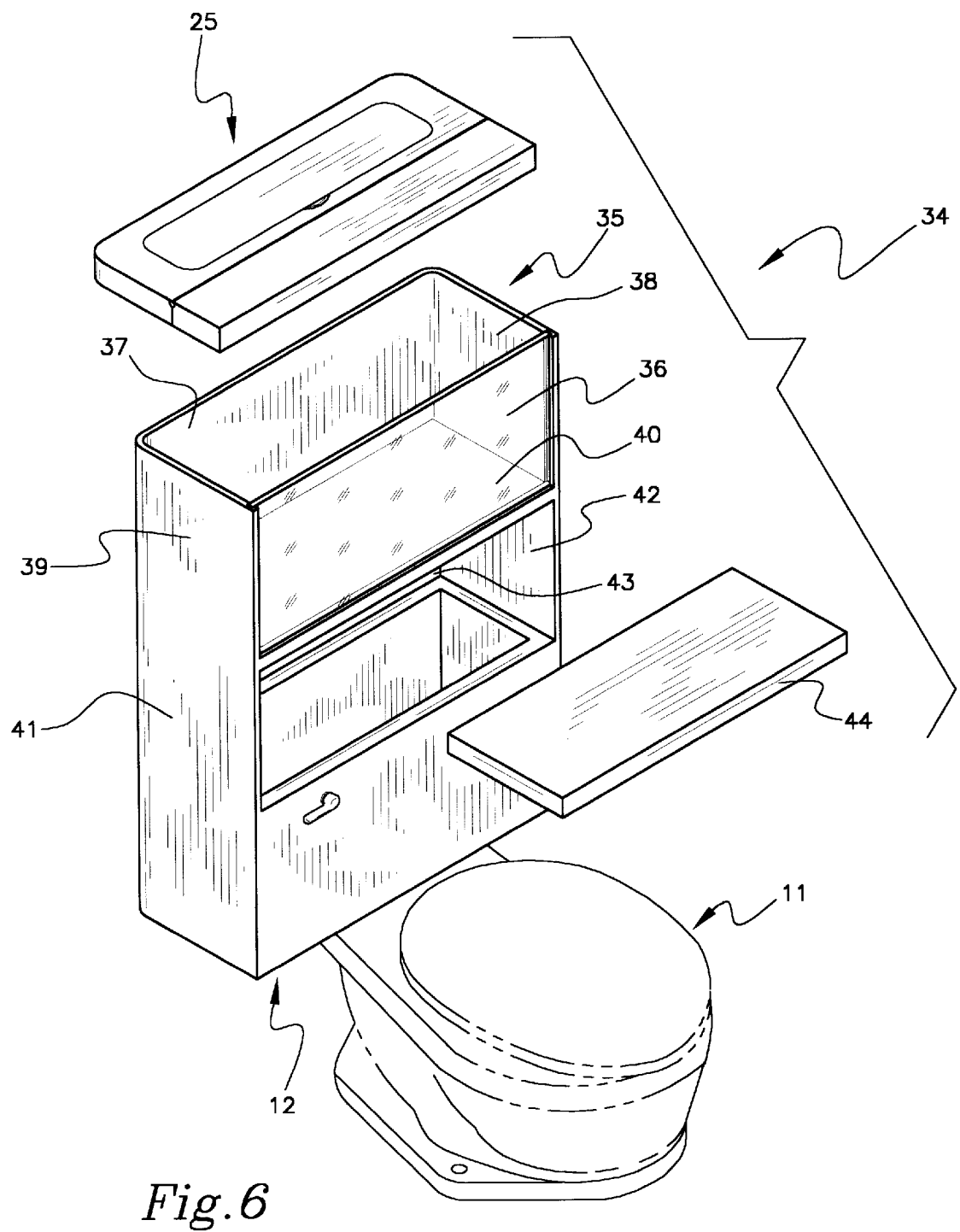
FIG. 6 is a schematic perspective view of a third embodiment of the present invention.

FIG. 6 depicts a third alternative embodiment 34. In this embodiment 34, the toilet has an aquarium reservoir 35 with an open top, a generally transparent front 36, a back 37, a pair of sides 38,39 and, a bottom 40. The bottom 40 of the aquarium reservoir is spaced apart the top 13 of the toilet tank assembly 12 with each of the sides 38,39 of the aquarium reservoir 35 associated with a side 16,17 of the toilet tank assembly 12. A pair of side panels 41,42 are extended between each of associated sides 16,17 of the toilet tank assembly 12 and the associated sides 38,39 of the aquarium reservoir 35. This embodiment also preferably includes a back panel 43 extending between the back 15 of the toilet tank assembly 12 and the back of the aquarium reservoir 35. In this embodiment, a base lid 44 substantially covers the opening of said top 13 of the toilet tank assembly 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A toilet, comprising:

a toilet bowl assembly;

a toilet tank assembly being coupled to said toilet bowl assembly;

said toilet tank assembly having a top, a front, a back, and a pair of sides, said front, back and sides of said toilet tank assembly defining an interior space, said top of said toilet tank assembly having an opening into said interior space of said toilet tank assembly;

a toilet water reservoir being located in said interior space;

a lid substantially covering said opening of said top of said toilet tank assembly;

said front of said toilet tank assembly being generally transparent; and wherein said toilet water reservoir comprises a mid wall and a pair of side walls, said mid wall of said toilet water reservoir being spaced apart from said back of said toilet tank assembly, said side walls being extended between said mid wall of said toilet water reservoir and said back of said toilet tank assembly.

2. The toilet of claim 1, wherein said lid has an interior, a top, a bottom, said top of said lid having a compartment.

3. The toilet of claim 2, wherein a cover substantially covers said compartment.

4. The toilet of claim 2, wherein said lid has front and back portions, said compartment being located in said back portion of said lid.

5. The toilet of claim 2, wherein said lid has front and back portions, and wherein said bottom of said lid has a light source being located on said front portion of said lid.

6. The toilet of claim 2, wherein said front and back portions of said lid are pivotally coupled to one another.

7. The toilet of claim 1, wherein each of said sides of said toilet tank assembly has front and back portions, said front portion of said side of said toilet tank assembly being positioned towards said front of said toilet tank assembly, said back portion of said side of said toilet tank assembly being positioned towards said back of said toilet tank assembly, and wherein said front portions of said sides of said toilet tank assembly are generally transparent.

8. The toilet of claim 1, wherein said toilet water reservoir has a mid wall interposed between said front and back of said toilet tank assembly, said mid wall of said toilet water reservoir being extended between said sides of said toilet tank assembly.

9. A toilet, comprising:

a toilet bowl assembly;

a toilet tank assembly being coupled to said toilet bowl assembly;

said toilet tank assembly having a top, a front, a back, and a pair of sides, said front, back and sides of said toilet tank assembly defining an interior space, said top of said toilet tank assembly having an opening into said interior space of said toilet tank assembly;

a toilet water reservoir being located in said interior space, said toilet water reservoir comprising a mid wall and a pair of side walls, said mid wall of said toilet water reservoir being spaced apart from said back of said toilet tank assembly, said side walls being extended between said mid wall of said toilet water reservoir and said back of said toilet tank assembly;

a lid substantially covering said opening of said toilet tank assembly, said lid having an interior, a top, a bottom, and front and back portions;

said top of said lid having a compartment, said compartment being located in said back portion of said lid, a cover substantially covering said compartment;

said bottom of said lid having a light source being located on said front portion of said lid;

said front and back portions of said lid being pivotally coupled to one another;

said front of said toilet tank assembly being generally transparent; and each of said sides of said toilet tank assembly having front and back portions, said front portion of said side of said toilet tank assembly being positioned towards said front of said toilet tank assembly, said back portion of said side of said toilet tank assembly being positioned towards said back of said toilet tank assembly.

10. A toilet comprising:

a toilet bowl assembly;

a toilet tank assembly being coupled to said toilet bowl assembly;

said toilet tank assembly having a top, a front, a back, and a pair of sides, said front, back and sides of said toilet tank assembly defining an interior space, said top of said toilet tank assembly having an opening into said interior space of said toilet tank assembly;

a base lid substantially covering said opening of said top of said toilet tank assembly;

an aquarium reservoir having an open top, a front, a back, a pair of sides and, a bottom, said bottom of said aqaurium reservoir being spaced apart said top of said toilet tank assembly, each of said sides of said aquarium reservoir being associated with a side of said toilet tank assembly;

a pair of side panels, one of said side panels being extended between one of said sides of said toilet tank assembly and the associated side of said aquarium reservoir, another of said side panels being extended between another of said sides of said toilet tank assembly and the associated side of said aqaurium reservoir;

a back panel being extended between said back of said toilet tank assembly and said back of said aqaurium reservoir;

said front of said aquarium reservoir being generally transparent; said base lid having an interior, a top, a bottom, and front and back portions;

said top of said base lid having a compartment, said compartment being located in said back portion of said base lid, a cover substantially covering said compartment;

said bottom of said base lid having a light source being located on said front portion of said base lid; and said front and back portions of said base lid being pivotally coupled to one another.

\* \* \* \* \*